June 7, 1955  J. C. McMULLEN  2,710,261
MINERAL FIBER COMPOSITIONS
Filed May 16, 1952
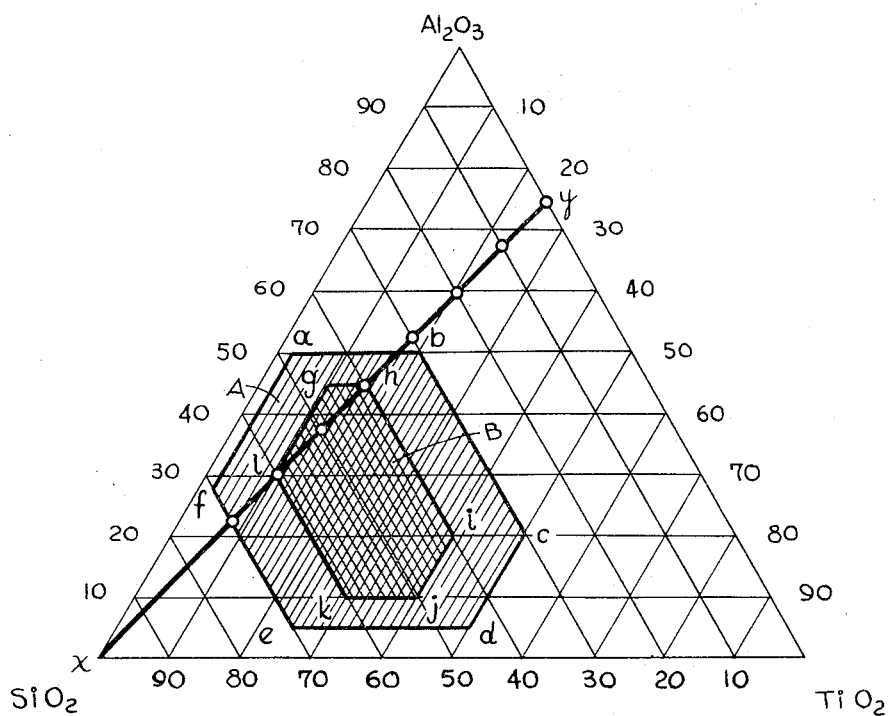
INVENTOR.
J.C. Mc MULLEN
BY 
ATTORNEY

United States Patent Office 2,710,261
Patented June 7, 1955

2,710,261

MINERAL FIBER COMPOSITIONS

John C. McMullen, Niagara Falls, N. Y., assignor to The Carborundum Company, Niagara Falls, N. Y., a corporation of Delaware Application May 16, 1952, Serial No. 288,206

8 Claims. (Cl. 106—50)

This invention relates to inorganic oxidic compositions, and particularly to such compositions in fibrous form suitable for use as a thermal insulating or filtering material, and to compositions for making the same.

The manufacture of inorganic fibers in the form commonly known and referred to as glass wool, slag wool or rock wool, depending upon the origin of the raw materials, is not new. Such products have heretofore been made from various metallurgical slags or from natural raw materials which have usually been of a calcareous or dolomitic base composition. Such products have proven quite satisfactory for many insulating and filtering purposes where the conditions of use have not been exacting. However, inorganic fibers which are highly calcareous or dolomitic are not too chemically resistant and often undergo a relatively rapid breakdown. For example, their solubility in hot acids is extremely high so that they are not satisfactory for use where the conditions of use involve the presence of acidic materials particularly at elevated temperatures.

Refractory mineral fibers have also been made from more pure raw materials in order to meet the demand for an inorganic fibrous material capable of use at higher temperatures. However, the use of such materials is necessarily restricted by the requirement for materials of high purity and consequent high cost and the extremely refractory nature of the raw materials from which such inorganic fibers have been made has involved certain manufacturing difficulties which add still further to the cost of the fibers. For instance, such fibers when produced contain an excessively high amount of non-fibrous material such as pelleted or otherwise unfiberized material. In other words, in order to obtain a desired amount of high grade fibrous material it is necessary to process a much greater amount of the raw material much of which after processing is not only difficult to separate from the fibrous material but is of a useless nature.

It is an object of the present invention to provide an inorganic fibrous material of new composition.

It is also an object of the present invention to provide inorganic oxidic material in fibrous form having a novel and desirable combination of properties.

It is a further object of the present invention to provide inorganic fibrous material which can be readily made in fibrous form and which will be more resistant to various corrosive conditions.

I have found that inorganic oxidic compositions in fibrous form suitable for use as a thermal insulating or filtering material, particularly in the presence of certain chemically corrosive materials such as hot acids or the like, can be obtained by melting and fiberizing mixtures of alumina, silica and titania, even though those materials contain minor amounts of certain impurities. Satisfactory fibers can be made in which the three named oxides are present in the proportions by weight of 30% to 70% $SiO_2$, 5% to 50% $Al_2O_3$ and 2½% to 50% $TiO_2$. However, for best results, taking into consideration such factors as ease of furnacing, quantity of fibers produced and quality of fibers, I prefer to maintain the composition of the fibers within the percentage ranges by weight of 40% to 60% $SiO_2$, 10% to 45% $Al_2O_3$, and 10% to 40% $TiO_2$. The alumina and silica are usually the predominant constitutents, being usually present in roughly equal parts by weight, amounting together to 85% to 90% by weight of the total composition. The third essential ingredient of the composition, namely, titania, is usually present to the extent of about 7½% up to 12% by weight.

The remainder of the composition consists of minor amounts of impurities normally present in the raw materials used in making the fibers such as iron oxide, zirconia and small amounts of alkali oxides. I have found that up to 10% of CaO can be tolerated without detrimental effect upon the chemical stability of the fibers, although I prefer to keep the amount of CaO even lower since it appears to coarsen the fibers to some extent. The amount of MgO should be kept below 5% since greater amounts decrease the resistance of the fibers to acid solubility. Small amounts of alkali oxides amounting to not more than 10%, and preferably much lower, can be tolerated. Small amounts of $B_2O_3$, as for example around 1%, are sometimes included in the raw batch to promote fluidity of the melt and further promote the fiberization of the molten material into fine fibers, but should not exceed 5% at the most.

One raw material which is available, inexpensive, and which has been found highly satisfactory as a source of the alumina and titania required for making inorganic fibrous material in accordance with the present invention is a titanium slag, obtained from the Titanium Alloy Manufacturing Division of the National Lead Company at Niagara Falls, New York. That material has heretofore been considered a waste product of relatively little or no value and therefore constitutes a very inexpensive source of the two ingredients alumina and titania. A typical chemical analysis for the above-mentioned slag is:

| | Percent by weight |
|---|---|
| $Al_2O_3$ | 74.20 |
| $TiO_2$ | 23.94 |
| FeO | 1.66 |
| $SiO_2$ | .20 |
| $ZrO_2$ | .10 |

The source material for silica may be either a quartz, flint, or white sand. When boric oxide is incorporated in the mix as an additional fluxing agent it is incorporated usually in the form of borax glass although borax, anhydrous boric acid or boric anhydride may be used.

Although I prefer to use a titanium slag of the type above-described in detail because of its inexpensiveness and also because it is relatively free of alkaline earth oxides and the minor amounts of iron oxide and other impurities contained in the slag are not present in amounts sufficient to have any noticeable detrimental effect upon the processing of the material or the properties of the final product, it is possible, and fully within the scope of the present invention, to replace the above-described titania slag by a mixture of the same oxides in comparably pure form.

The drawing is a triaxial phase diagram of the $$Al_2O_3\text{-}SiO_2\text{-}TiO_2$$

system. On the triaxial diagram of the drawing, the larger shaded area A defines the compositions which are usable in fiber form within the teachings of the present invention. The smaller cross-shaded area B defines the preferred range of such compositions in that the fiber compositions falling within the area B offer one or more of the advantages of being more easily fused and fiberized, are obtained in higher yield on the basis of the amount of material furnaced, and quality of fiber secured. The three corner points of the triaxial diagram marked SiO₂, Al₂O₃ and TiO₂, respectively, per customary practice, represent 100% of the named oxides. The remaining points on the diagram represent different proportions of the three oxides as determined by the coordinates of the point in question in accordance with standard practice.

Both the areas A and B are polygons which may be defined by lines connecting in seriation their respective vertices, points $a$ through $f$, inclusive, being the vertices of area A, and points $g$ through $l$, inclusive, being the vertices of area B. The locations of these vertices, in terms of the percentages of SiO₂, Al₂O₃ and TiO₂ are as follows:

| Point | Percent SiO₂ | Percent Al₂O₃ | Percent TiO₂ |
|---|---|---|---|
| a | 47½ | 50 | 2½ |
| b | 30 | 50 | 20 |
| c | 30 | 20 | 50 |
| d | 45 | 5 | 50 |
| e | 70 | 5 | 25 |
| f | 70 | 27½ | 2½ |
| g | 45 | 45 | 10 |
| h | 40 | 45 | 15 |
| i | 40 | 20 | 40 |
| j | 50 | 10 | 40 |
| k | 60 | 10 | 30 |
| l | 60 | 30 | 10 |

The heavy line $x$—$y$ on the diagram represents the fiber composition made using flint (SiO₂) and, as a source of alumina and titania, a slag of the above composition, the percentage of slag varying in ten percent increments. The point $y$ represents the proportions of Al₂O₃ and TiO₂ in the slag without any addition thereto. The first four compositions at the $y$ end of the line when fused and blown did not form fibers but resulted in the formation of pellets. Those compositions, namely, those containing from 40% to 60% by weight of SiO₂ and 60% to 40% by weight of the titania slag, falling within area A were satisfactorily furnaced and blown into satisfactory fibers. The compositions higher in silica were too viscous for proper processing.

In order that the invention may be more clearly understood, the following examples are given of compositions from which a high quality fibrous material in substantial quantity has been made.

*Example I*

A raw batch of the following composition was prepared:

Parts by weight
Titanium slag (as above described) _____ 50
Flint (SiO₂) _____ 50
Borax glass (Na₂B₄O₇) _____ 1½

The above composition after thorough mixing was fused in an arc furnace of the type commonly used for making alumina abrasive materials until a substantial bath of molten material was obtained. The furnace was then tilted to allow the molten material to pour from the furnace in the form of a small stream which was struck at substantially right angles thereto by a stream of compressed air or steam at 80 to 100 pounds per square inch pressure. The stream of molten material was dissipated in the form of fine fibrous material which was collected upon a one quarter inch mesh screen placed in front of the furnace about five feet away. The resulting fibrous material, after the removal of the greater part of the pelletized material, was ready for fabrication into bats or otherwise packaged and shipped in bulk form for use either loose or in otherwise fabricated form.

The following is a chemical analysis of the resulting fibrous glass:

Per cent
SiO₂ _____ 46.99
Al₂O₃ _____ 43.19
TiO₂ _____ 7.55
Fe₂O₃ _____ .43
Na₂O _____ .56
B₂O₃ _____ 1.28

The resulting fibrous material has a melting point in the neighborhood of 1680° C. When exposed to boiling distilled water for a period of 24 hours the fibrous material made according to Example I above showed a loss in weight of only .11% which is substantially lower than the loss in weight experienced by slag wools containing substantial amounts of alkaline earth oxides when exposed to the same condition. When exposed to leaching in normal hydrochloric acid at a temperature of 96° C. for one hour the fibrous material made according to Example I showed a loss in weight of only 8.41% whereas comparable slag wools of alumina and silica but containing substantial amounts of alkaline earth oxides when exposed to similar chemical action experienced a loss of more than 50% by weight of the material.

*Example II*

A raw batch of the following composition has also been found satisfactory for the making of fibrous material in accordance with the present invention, the procedure followed being the same as that set forth for Example I above.

Parts by weight
Titanium slag (as above described) _____ 30
A–1 grade white alumina ore _____ 20
Flint _____ 50
Borax glass (Na₂B₄O₇) _____ 1½

The white alumina ore used in Example II was that sold by the Aluminum Company of America as A–1 grade white alumina ore of which the following is a typical chemical analysis:

Percentage
Al₂O₃ _____ 98.89
SiO₂ _____ .03
Na₂O _____ .55
Fe₂O₃ _____ .03
TiO₂ _____ .004
H₂O (combined) _____ .50
H₂O (free) _____ 1.25

The fibrous material obtained was very similar in physical and chemical characteristics to that obtained by Example I above. The calculated chemical analysis of the resulting fibrous glass was as follows:

Percent
SiO₂ _____ 49.0
Al₂O₃ _____ 42.0
TiO₂ _____ 7.1
Fe₂O₃ _____ 0.4
Na₂O _____ 0.5
B₂O₃ _____ 1.0

A highly satisfactory yield of fine, high quality fibrous material was obtained from the following mix in which the titania content is substantially higher than it is in the fibrous material of Examples I and II.

*Example III*

Percent by weight
SiO₂ _____ 40
Al₂O₃ _____ 20
TiO₂ _____ 40

Among other materials which can be used as a source of the alumina, silica and/or titania for making inorganic fibers in accordance with my teachings are Demarara bauxite, Indian bauxite, kyanite, fireclay, grog, rutile and Georgia bauxite.

I have found that in making inorganic fibrous material of the above compositions the percentage of pellets or non-fibrous material is substantially lower than the amount of pellets formed with other compositions of fibrous material. For example, the fibrous material made in accordance with Example I above was subjected to a water sedimentation separation process for the purpose of separating the pelleted or non-fibrous material from the fibrous material and it was found that the amount of pellets or non-fibrous material amounted to around 27½%. Moreover, much of the pelleted material was of such fineness that it was found unobjectionable from the standpoint of interference with the insulating properties of the material. By contrast, the fibrous material made from other compositions was found to contain as much as twice the amount of pelleted material and moreover the pellets were larger in size and therefore more objectionable than the very fine pelleted material present in fibers of the above compositions.

The superiority of the inorganic fibers made in accordance herewith as compared to other slag wool fibers of calcareous nature in respect to the ability of the fibrous material to resist a breakdown in the presence of acids is shown by the table below which sets forth the compositions of several inorganic fibrous materials and also the percentage loss in weight after leaching with normal HCl for one hour at 96° C. The compositions of inorganic fibrous materials set forth in columns A, B and C represent those of three different refractory fibers containing various percentages of titania but also containing large amounts of calcium oxide. Columns D and E represent the two different compositions made in accordance with the present invention, column E representing a composition made in accordance with Example II herein. It is to be noted that the two inorganic oxidic fibers made in accordance with the present invention showed a loss in weight of only 8–9% as a result of leaching with HCl whereas all three fibers containing substantial amounts of lime show a loss in weight of from 67% to 79% by weight. It is therefore apparent that the fibers of the present invention are much superior to various prior art slag or mineral wools which contain substantial amounts of calcium oxide or other alkaline earth materials.

|  | A | B | C | D | E |
|---|---|---|---|---|---|
| $SiO_2$ | 12 | 12 | 12 | 48.8 | 49.0 |
| $Al_2O_3$ | 26 | 26 | 26 | 37.0 | 42.0 |
| $TiO_2$ | 5 | 10 | 15 | 12.0 | 7.1 |
| $Fe_2O_3$ | 8 | 8 | 8 | .7 | 0.4 |
| $CaO$ | 45 | 40 | 35 |  |  |
| $Na_2O$ | 4 | 4 | 4 | .5 | 0.5 |
| $B_2O_3$ |  |  |  | 1.0 | 1.0 |
| Percent loss in wt. after leaching in 1 Normal HCl for 1 hr. at 96° C | 78.44 | 67.22 | 67.19 | 8.41 | 8.93 |

Having described the invention in detail it is desired to claim:

1. An inorganic fibrous material having by oxide analysis approximately the following composition by weight: silica 47%, alumina 43%, titania 7½%, boric acid 1¼% and the remainder consisting essentially of iron oxide and alkali oxides.

2. An inorganic fibrous material consisting essentially of alumina and silica in substantially equal parts by weight totaling approximately 90% by weight of the fibrous material and containing about 7½% of titania and containing less than 10% by weight of CaO and less than 5% by weight of MgO.

3. An inorganic fibrous material consisting essentially of by oxide analysis 30% to 70% by weight $SiO_2$, 5% to 50% by weight $Al_2O_3$ and 2½% to 50% by weight of $TiO_2$, and containing less than 10% by weight of CaO and less than 5% by weight of MgO.

4. An inorganic fibrous material consisting essentially of by oxide analysis 30% to 70% by weight $SiO_2$, 5% to 50% by weight $Al_2O_3$ and 2½% to 50% by weight $TiO_2$, less than 10% CaO, less than 5% MgO, less than 5% alkali oxides and less than 5% $B_2O_3$.

5. An inorganic fibrous material consisting essentially of by oxide analysis 30% to 70% by weight $SiO_2$, 5% to 50% by weight $Al_2O_3$ and 2½% to 50% by weight of $TiO_2$, and containing less than 10% by weight of CaO and less than 5% by weight of MgO and around 1% $B_2O_3$.

6. An inorganic fibrous material consisting essentially of by oxide analysis 40% to 60% by weight $SiO_2$, 10% to 45% by weight $Al_2O_3$ and 10% to 40% by weight of $TiO_2$, and containing less than 10% by weight of CaO and less than 5% by weight of MgO.

7. An inorganic fibrous material consisting essentially of by oxide analysis 40% to 60% by weight $SiO_2$, 10% to 45% by weight $Al_2O_3$ and 10% to 40% by weight $TiO_2$, less than 10% CaO, less than 5% MgO, less than 5% alkali oxides and less than 5% $B_2O_3$.

8. A raw bath for making inorganic fibers consisting essentially of approximately equal amounts by weight of silica and a titania slag comprising approximately three-fourths $Al_2O_3$ and one-fourth $TiO_2$.

References Cited in the file of this patent

FOREIGN PATENTS 495,654    Great Britain _____ 1938